3,167,496
HYDROGENATION CATALYST AND PROCESS
Ernest Solomon, Montclair, N.J., assignor, by mesne assignments, to Pullman Incorporated, a corporation of Delaware
No Drawing. Filed Aug. 11, 1959, Ser. No. 832,891
9 Claims. (Cl. 208—143)

This invention relates to a process for the hydrogenation of unsaturated hydrocarbons. In one aspect this invention relates to an improved type of catalyst particularly useful for the hydrogenation of unsaturated hydrocarbons and to a method of preparation of such catalyst. In another aspect this invention relates to a process for altering the hydrogen-carbon ratio of a single unsaturated hydrocarbon or of a mixture of unsaturated hydrocarbons by hydrogenation in the presence of a particular catalyst.

The treatment of unsaturated hydrocarbons with hydrogen in the presence of a hydrogenation catalyst is well known in the art. With some exceptions the desirability of liquid fuels and lubricants is roughly proportional to the combined hydrogen that each contains. With the exception of cracked products, however, many petroleum fractions contain little or none of the easily hydrogenated olefinic groups so that deep-seated chemical changes are necessary to promote the entrance of hydrogen atoms into the molecules. High grade kerosenes are made up of saturated hydrocarbons, paraffins, and naphthenes and are low in sulfur, nitrogen and oxygen compounds. However, kerosene distillates from many crudes usually possess few or none of these characteristics. By hydrogenation, aromatics of such kerosene distillates can be converted to naphthenes, any of the olefins present are saturated while sulfur, nitrogen and other extraneous elements are substantially removed as hydrogen sulfide, ammonia, etc., by the cracking and reduction of corresponding compounds.

The hydrogenation of aromatic hydrocarbons whether they are substantially the only components of the charge stock or are present as components of a hydrocarbon fraction is relatively difficult to effect. With the presently used catalysts a relatively severe combination of conditions must be applied even with catalysts of high activity. Under such severe conditions the selectivity of catalysts decreases due to concomitant reactions such as hydrocracking. This latter reaction is especially undesirable when it is desired to produce high yields of relatively pure petrochemicals since it leads to loss of yield of the desired product and makes the process more difficult to control to obtain the desired results.

It is an object of this invention to provide an improved hydrogenation process.

It is a further object of this invention to provide an improved process for the hydrogenation of aromatic hydrocarbons in good yield and selectivity.

It is a further object of this invention to provide a process of hydrogenating a hydrocarbon fraction containing unsaturated hydrocarbons by contacting said fraction with an improved catalyst comprising a compound of molybdenum.

It is a further object to provide a new and improved particular hydrogenation catalyst and a method for the manufacture thereof.

Various other objects and advantages of this invention will become apparent to those skilled in the art from the accompanying description and disclosure.

The above objects are accomplished by providing a particular catalyst composition comprising molybdenum and nickel in a particular atomic ratio supported on silica. The catalytic agent may be in elemental form although it is preferred that the molybdenum and nickel be in combined form such as in the form of their oxides and/or sulfides. The improved activity of the catalysts of this invention is realized by preparation of the catalysts in a particular manner to provide catalysts in which the concentration of the molybdenum compound ranges between about 6 and about 15 weight percent (calculated as molybdenum trioxide) based on the total weight of the catalyst and such that the catalytic agent comprising nickel is present in an amount to provide a finished catalyst in which the atomic ratio of molybdenum to nickel is between about 5 and about 6. To obtain this atomic ratio within the aforesaid concentration of the molybdenum compound, the catalytic agent comprising nickel is present in an amount between about 0.52 and about 1.56 or 1.6 (calculated as nickel oxide) weight percent based on the total weight of the catalyst.

As indicated above, silica is used as the support of the catalysts of the present invention. The silica employed may be prepared by methods well known to those skilled in the art. For example, siliceous hydrogels may be prepared by hydrolysis of an alkyl orthosilicate such as ethyl orthosilicate. Another method comprises commingling an acid such as a hydrochloric acid or sulfuric acid with commercial water soluble sodium silicate under conditions to precipitate silica, followed by washing with acidulated water or otherwise to remove sodium ions. Prior to use in the preparation of the catalysts of this invention, the silica gel is preferably calcined at an elevated temperature such as between about 600° F. and about 1200° F.

The catalysts of this invention may be prepared by a variety of methods without departing from the scope of this invention. The preferred method comprises impregnation of silica, and preferably a high purity silica, either in the form of a hydrous gel or calcined gel, with the precursor of the molybdenum catalytic agent prior to impregnation with the precursor of the nickel catalytic agent. This method leads to the production of catalysts of enhanced activity as compared with catalysts prepared by the reverse order to impregnation of the silica. In a more specific embodiment of this invention the silica is impregnated with a solution of the molybdenum precursor compound, typical examples of which are silicomolybdic acid, phosphomolybdic acid and ammonium molybdate. The composite is then dried, if desired, and is preferably calcined at an elevated temperature prior to incorporation of the nickel precursor compound. Typical examples of the latter type of compound are nickel acetate, nickel chloride, nickel sulfate, and nickel nitrate. The composite is then dried, if desired, and/or calcined at an elevated temperature. Improved catalysts also are produced by passing hydrogen sulfide into the silica impregnated with the molybdenum and nickel precursor compounds. Another suitable method of preparation comprises dry mixing of the silica and molybdenum precursor compound followed by calcination of the mixture. When employed, the drying steps may be effected at a temperature of between about 100° F. and about 400° F. Calcination is effected at an elevated temperature such as between about 600° F. and about 1200° F. in the presence of air, nitrogen, oxygen, or inert gases.

In accordance with a preferred embodiment of this invention, the calcined composite comprising the oxide is preconditioned with a gaseous stream comprising hydrogen sulfide, or the metal sulfides may be formed in situ such as, for example, when the feed stock to be treated contains a high sulfur content. When the catalysts are preconditioned by contacting with hydrogen sulfide, hydrogen is preferably employed as the carrier gas although other carrier gases such as nitrogen and argon may be employed. The concentration of hydrogen sulfide in the carrier gas may vary between about 0.1 and about 5 mole percent, preferably between about 1 and about 3 mole percent. The preconditioning with hydrogen sulfide may be effected at a temperature between about 400° F. and about 1000° F. and at a pressure between about 50 and about 2000 pounds per square inch gage. This treatment is preferably continued until sulfiding reaches a steady state, i.e. until the inlet and outlet gas compositions are identical. As a result of sulfiding, the oxide of molybdenum is converted to a sulfide such as $MoS_2$ or $MoS_3$ or mixtures thereof, and the oxide of nickel is converted to a sulfide such as $NiS$ or $Ni_2S_3$ or mixtures thereof.

The above-described catalysts find particular utility in the hydrogenation of unsaturated hydrocarbons including olefinically and aromatically unsaturated compounds. The feed stock may consist of a single unsaturated compound such as when a high purity product is desired or it may comprise a mixture of such hydrocarbons. Thus, for example, aromatically unsaturated compounds such as benzene, toluene, naphthalene, styrene, and derivatives thereof are suitable and typical reactants as well as aliphatically unsaturated compounds including acyclic and alicyclic compounds such as, for example cyclohexene, cyclohexadiene, butenes, pentenes, hexenes, heptenes, octenes, nonenes, cyclopentenes, cyclopentadienes, methylcyclopentene, trimethylethylene, acetylenes, indene and derivatives thereof.

Also included within the scope of this invention is the hydrogenation of gasoline produced by a catalytic cracking process such gasoline usually being high in olefins, particularly monoolefins. Other feed stocks which may be hydrogenated by the catalysts of this invention are those in which the carbon to hydrogen ratio is high, such as reduced crude oil and vacuum tower bottoms, i.e. hydrocarbon stock from which the lighter distillable fractions have been removed. Hydrogenation of such residual oils increases the gravity thereof and tends to prevent excessive coke lay down during subsequent treatment thereof such as during a subsequent hydrocracking process. In addition, the feed stock may be a hydrocarbon fraction boiling within the range of about 325° F. to about 600° F. such as in particular a kerosene fraction containing unsaturated components. By hydrogenation, the aromatics contained in the petroleum fraction are converted to naphthenes, any of the olefins which may be present are saturated to form a hydrogenated product substantially free of unsaturated components and of improved smoke point. At the same time, sulfur, nitrogen and other extraneous elements which are usually present in the kerosene fraction or vacuum bottoms feed stocks, for example, are substantially removed probably in the form of hydrogen sulfide, ammonia, etc.

In accordance with the process of this invention, a hydrocarbon or hydrocarbon fraction such as those described above, is contacted with the catalysts of this invention in the presence of added hydrogen under hydrogenation conditions with net consumption of hydrogen to cause selective hydrogenation of the feed components with minimum hydrocracking to produce product having a lower degree of unsaturation which, in the case of a hydrocarbon fraction boiling within the kerosene range is evidenced by improvement in smoke point. The process of this invention may be conducted over a wide range of temperatures without departing from the scope of this invention. The operating conditions include a temperature within the range of from about 200° F. and about 850° F., a pressure between about 0 pounds per square inch gage (p.s.i.g.) and about 2000 p.s.i.g. and a space velocity (defined as the feed per hour per pound of catalyst) between about 0.1 and about 15. Generally speaking, the conditions within which optimum results are achieved, i.e. high activity and good selectivity, include a temperature of between about 400° F. and about 800° F., a pressure between about 200 and about 900 p.s.i.g. and a weight space velocity of between about 1 and about 10. When the feed stock to be hydrogenated is a hydrocarbon fraction boiling within the kerosene boiling range, e.g. between about 350° F. and about 550° F., the particularly preferred temperature ranges between about 400° F. and about 700° F.

Hydrogen should be introduced into the reaction zone at a rate of from about 300 to about 20,000 standard cubic feet per barrel (s.c.f.b.) or the hydrogen to hydrocarbon mole ratio may fall within the range of from about 0.35 to about 50, preferably from about 1 to about 25 moles of hydrogen per mole of hydrocarbon with the total reaction pressure maintained between about 0 and about 2000 pounds per square inch gage (p.s.i.g.), preferably between about 200 and about 900 p.s.i.g. It is desirable that the hydrogen partial pressure be carefully controlled within the preferred range of from about 15 to about 1500 pounds per square inch absolute (p.s.i.a.) preferably from about 100 to about 900 p.s.i.a. to effect the desired conversion while maintaining the activity of the catalyst at a high level.

The catalysts of this invention are also useful for desulfurizing hydrocarbon oils, e.g. naphthas, kerosene, gasoline, gas oils, total crudes, etc. The desulfurization is effected at a temperature of about 600° F. to about 900° F., preferably about 650° F. to about 850° F. The desulfurization reactions can be effected at either exceptionally high pressures in the order of up to about 2000 p.s.i.g. or at pressures as low as 100 p.s.i.g. More usually, desulfurization by means of the catalysts of this invention is accomplished at a pressure of about 500 to about 1000 p.s.i.g. The desulfurization is effected in the presence of hydrogen and the conditions of operation are such that hydrogen is supplied to the process at the rate of about 1000 to about 20,000 s.c.f.b., preferably at the rate of between about 3000 and about 10,000 s.c.f.b. Generally, the weight space velocity ranges between about 0.1 and about 15 pounds per hour of hydrocarbon feed charged to the desulfurization zone per pound of catalyst present therein, and more usually from about 1 to about 8.

The catalysts of this invention may be employed effectively as pellets, pills, spheres, rings, extrusions, lumps, granules or in a powdered state and these forms may be used in both fluidized systems and those employing moving beds of contact material in either concurrent or countercurrent flow relative to the reactants. The catalysts of this invention may also be employed in a slurry type system without departing from the scope of this invention.

The following examples are offered as a better understanding of the present invention and are not to be construed as unnecessarily limiting thereto.

CATALYST I

A solution of 3.315 grams of ammonium molybdate, $(NH_4)_6Mo_7O_{24} \cdot 4H_2O$, dissolved in 30 ml. of hot distilled water was added to 26.973 grams of powdered silica gel, prepared by calcining desiccant grade silica gel (99.9 weight percent $SiO_2$) for 2 hours at 1000° F. The well-mixed paste was dried to a solid in an oven at 250° F. for 19 hours and then calcined for 2 hours at 1000° F. The calcined product (29.36 grams) was impregnated with a solution containing 0.764 gram of nickel acetate tetrahydrate to give a homogeneous paste. The paste was dried to a solid in an oven at 250° F. for 22 hours, followed by calcination for 2 hours at 1000° F. The calculated composition, based upon the ingredients added, was 9.1 weight percent $MoO_3$, 0.8 weight percent NiO, the remainder $SiO_2$, the Mo/Ni atom ratio being 5.8.

CATALYST II

A solution of ammonium molybdate prepared by dissolving 1.476 grams of $(NH_4)_6Mo_7O_{24}\cdot4H_2O$ in 10 ml. distilled water, was added to 18.551 grams of powdered silica prepared by calcining desiccant grade silica gel (99.9 weight percent silica) for 2 hours at 1000° F. After thorough mixing, the mixture was dried at 250° F. for 18 hours. The dried powder was reimpregnated with additional ammonium molybdate solution, i.e. 0.824 gram $(NH_4)_6Mo_7O_{24}\cdot4H_2O$ in water, to wet the solid thoroughly, and redried 18 hours at 250° F. The dried solid was calcined 2 hours at 1000° F. The calcined product (20.166 grams) was impregnated with an aqueous solution containing 1.277 grams of nickel acetate tetrahydrate to give a homogeneous paste. The paste was dried to a solid at 250° F. in an oven. After 93 hours at 250° F., the solid was then calcined 2 hours at 1000° F. The calculated composition, based upon ingredients added, was 9.01 weight percent $MoO_3$, 1.87 weight percent NiO and the remainder $SiO_2$, thus the Mo/Ni atom ratio was 2.5.

CATALYST III

Powdered silica prepared by calcining desiccant grade silica gel (99.9 weight percent $SiO_2$) for 2 hours at 1000° F. and weighing 23.946 grams was added to a solution of 6.630 grams ammonium molybdate,

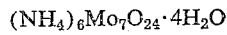

$(NH_4)_6Mo_7O_{24}\cdot4H_2O$ dissolved in 30 ml. of hot distilled water. The well-mixed paste was dried to a solid in an oven at 250° F. for 19 hours. The solid was mixed thoroughly and then calcined 2 hours at 1000° F. The calcined product, weighing 29.058 grams, was impregnated with an aqueous solution containing 1.543 grams of nickel acetate tetrahydrate. The slurry was mixed thoroughly and dried to a solid at 250° F. for 22 hours. The dried product was calcined 2 hours at 1000° F. The calculated composition, based upon ingredients added, was 18.1 weight percent $MoO_3$, 1.58 weight percent NiO, and the remainder $SiO_2$, the Mo/Ni atom ratio being 6.

The relative effectiveness of the above-described catalysts was determined by using the same in a laboratory hydrogenation test unit using benzene as the typical test feed, the test operation being carried out at conversions well below equilibrium conditions in order to obtain an accurate comparison of the catalyst activities. In these tests, the reactor (8" long with ½" inner diameter) was charged with 5 grams of catalyst powder using glass wool as packing, and Alundum as the preheat zone. The reactor was connected into the unit and a hydrogen-hydrogen sulfide gas mixture containing 2 moles percent hydrogen sulfide was passed through the reactor at a pressure of about 325 p.s.i.g., the temperature was then raised to about 750° F., and was held under these conditions for about 1 hour while passing the $H_2/H_2S$ gas stream therethrough. At the start of each run, the $H_2/H_2S$ stream was then allowed to pick up benzene, the mole percent of benzene in the $H_2/H_2S$ stream being constant at 0.55. In testing each catalyst the flow rate of the $H_2/H_2S$/benzene mixture through the reactor was changed in order to obtain at least two different conversions for each catalyst for calculation of the hydrogenation rate constant at a definite temperature, i.e. at 750° F. as expressed as $k_{750°\ F.}$. The value of "$k$" represents the efficiency of the catalyst to hydrogenate benzene to saturated liquid product at standard conditions of 325 p.s.i.g. and 750° F. in the above-described system, and it relates to space velocity and conversion. The value of "$k$" was then converted to the space velocity required to obtain a 90 percent conversion of benzene under these test conditions. It should be borne in mind that in this test operation the contact time in each instance was very low due to the fact that only 5 grams of catalyst were employed. This was done in order to operate well below equilibrium conditions and thus obtain accurate comparisons. In each instance, however, at higher contact times, i.e. in the presence of more catalyst, the conversion of benzene is proportionately higher, but the activity of the catalyst remains the same. The test conditions and results of these runs are set-forth in the following Table I.

*Table I*

| Run No. | 1 | | | 2 | | 3 | | | |
|---|---|---|---|---|---|---|---|---|---|
| Catalyst No. | I | | | II | | III | | | |
| Composition: | | | | | | | | | |
| Percent $MoO_3$ | 9.1 | | | 9.0 | | 18.1 | | | |
| Percent NiO | 0.8 | | | 1.9 | | 1.6 | | | |
| Mo/Ni | 5.8 | | | 2.5 | | 6.0 | | | |
| Support | silica | | | silica | | silica | | | |
| Pretreatment of Catalyst: | | | | | | | | | |
| Charge, grams | 5.0 | | | 5.0 | | 5.0 | | | |
| Temperature, °F | 750 | | | 750 | | 750 | | | |
| Pressure, p.s.i.g. | 330 | | | 330 | | 300 | | | |
| Gas Composition | (¹) | | | (¹) | | (¹) | | | |
| Time, hours | 1.0 | | | 1.0 | | 1.0 | | | |
| Test Conditions: | | | | | | | | | |
| Catalyst Temperature, °F | 761 | 757 | 694 | 750 | 750 | 752 | 757 | 707 | 707 |
| Reaction Pressure, p.s.i.g. | 330 | 300 | 330 | 322 | 322 | 330 | 330 | 330 | 330 |
| Flow rate, standard cc./min. | 128 | 63 | 63 | 298 | 131 | 95 | 170 | 160 | 124 |
| Feed | benzene | benzene | benzene | benzene | benzene | benzene | benzene | benzene | benzene |
| Carrier Gas | (¹) | (¹) | (¹) | (¹) | (¹) | (¹) | (¹) | (¹) | (¹) |
| Results: | | | | | | | | | |
| Conversion, percent | 28 | 51 | 37 | 11 | 13 | 32 | 22 | 17 | 18 |
| Hydrogenation activity constant, $k_{750°\ F.}$ | 8.8 | 8.8 | 8.8 | 4.6 | 4.6 | 7.9 | 7.9 | 7.9 | 7.9 |
| Space velocity required to obtain 90% conversion of benzene | 0.0021 | 0.0021 | 0.0021 | 0.0011 | 0.0011 | 0.0019 | 0.0019 | 0.0019 | 0.0019 |

¹ 2 mole percent $H_2S$ in $H_2$.

From the above, it is apparent that at the relatively low concentration of molybdenum compound (9.0 weight percent) as in Catalysts I and II above, in contrast to a substantially higher level of molybdenum concentration as in Catalyst III, an atom ratio of Mo/Ni of 5.8 leads to a significantly more active hydrogenation catalyst than the catalyst in which the atom ratio of Mo/Ni is of the order of about 2.5.

In another example, Catalyst IV containing 13.8 percent molybdenum oxide and 3.1 percent cobalt oxide supported on gamma-alumina was tested employed the same procedure and substantially the same conditions as employed in runs 1-3 of the above Table I. The operating conditions and results of this test are given in the following Table II.

Table II

| Run No. | 4 | |
|---|---|---|
| Catalyst No. | IV | |
| Composition: | | |
| Percent MoO₃ | 13.8 | |
| Percent CoO | 3.1 | |
| Mo/Co | 2.5 | |
| Support | alumina | |
| Pretreatment of Catalyst: | | |
| Charge, grams | 5.0 | |
| Temperature, °F | 750 | |
| Pressure, p.s.i.g. | 318 | |
| Gas Composition | 2% H₂S in H₂ | |
| Time, hours | 1.0 | |
| Test Conditions: | | |
| Catalyst Temperature, °F | 750 | |
| Reaction Pressure, p.s.i.g. | 318 | |
| Flow rate, standard cc./min. | 77 | 42 |
| Feed | benzene | benzene |
| Carrier Gas | 2% H₂S in H₂ | |
| Results: | | |
| Conversion, percent | 22 | 42 |
| Hydrogenation activity, $k_{750°F}$ | 4.4 | 4.4 |
| Space velocity required to obtain 90% conversion of benzene | 0.0010 | 0.0010 |

Comparison of the results obtained with Catalyst IV and those obtained with Catalyst I of Table I above demonstrates the fact that the catalysts of this invention possess significantly higher hydrogenation activity than a typical prior art cobalt molybdate catalyst.

Various alterations and modifications of the catalysts and process of this invention may become apparent to those skilled in the art without departing from the scope of this invention.

Having described my invention, I claim:

1. A process which comprises hydrogenating an unsaturated hydrocarbon by contacting said hydrocarbon with a catalyst consisting of silica, between about 6 and about 15 weight percent of a compound of molybdenum selected from the group consisting of an oxide and sulfide thereof, and between about 0.5 and about 1.6 weight percent of a compound of nickel selected from the group consisting of an oxide and sulfide thereof, the atom ratio of molybdenum to nickel being between about 5 and about 6, at a temperature between about 200° F. and about 800° F. in the presence of added hydrogen.

2. A process which comprises treating a catalyst consisting of silica, between about 6 and about 15 weight percent of molybdenum oxide and between about 0.5 and about 1.6 weight percent of nickel oxide, the atom ratio of Mo to Ni being between about 5 and about 6, with a hydrogen-rich gas containing hydrogen sulfide and contacting an unsaturated hydrocarbon with said catalyst in the presence of added hydrogen at a temperature between about 400° F. and about 800° F. such that hydrogenation of said hydrocarbon is effected.

3. A process which comprises contacting a hydrocarbon fraction containing unsaturated components with a sulfided catalyst consisting of silca, nickel oxide and between about 6 and about 9 weight percent molybdenum oxide, the atom ratio of molybdenum to nickel being between about 5 and about 6, in the presence of a hydrogen-rich gas at a temperature between about 200° F. and about 800° F. and a pressure between about 200 and about 1000 pounds per square inch, such that hydrogenation of said hydrocarbon fraction is effected.

4. A process which comprises contacting an aromatically unsaturated hydrocarbon with a catalyst consisting of about 9 weight percent molybdenum and about 0.8 weight percent nickel oxide supported on silica in the presence of a hydrogen-rich gas containing hydrogen sulfide at a temperature between about 450° F. and about 800° F., such that said hydrocarbon is hydrogenated.

5. A process which comprises treating a catalyst consisting of silica, nickel oxide and between about 6 and about 15 weight percent of an oxide of molybdenum, the atom ratio of molybdenum to nickel being between about 5 and about 6, with a hydrogen-rich gas containing between about 0.1 and about 5 mole percent hydrogen sulfide at a temperature between about 400° F. and about 1000° F. and a pressure between about 50 and about 2000 pounds per square inch and contacting an unsaturated hydrocarbon with said catalyst in the presence of a hydrogen-rich gas under hydrogenation conditions including a temperature between about 200° F. and about 800° F. and a pressure between about 200 and about 900 pounds per square inch, such that hydrogenation of said unsaturated hydrocarbon is effected.

6. A process which comprises upgrading a hydrocarbon fraction boiling within the kerosene boiling range which comprises contacting said fraction with a sulfided catalyst consisting of silica, between about 6 and about 15 weight percent molybdenum oxide, and nickel oxide in an amount to provide an atom ratio of molybdenum to nickel of between about 5 and about 6, in the presence of added hydrogen at a temperature between about 400° F. and about 700° F.

7. A catalyst composition consisting of between about 6 and about 15 weight percent of a compound of molybdenum selected from the group consisting of an oxide and sulfide thereof, and a compound of nickel selected from the group consisting of an oxide and sulfide thereof, the molybdenum to nickel ratio being between about 5 and about 6, supported on silica.

8. A catalyst composition consisting of about 9 weight percent molybdenum oxide and about 0.8 weight percent nickel oxide supported on silica.

9. A process which comprises contacting a feed comprising aromatically unsaturated hydrocarbons and hydrogen with a catalyst consisting of silica having deposited thereon between about 6 and about 15 weight percent of a compound of molybdenum selected from the group consisting of an oxide and a sulfide thereof and between about 0.5 and about 1.6 weight percent of a compound of nickel selected from the group consisting of an oxide and a sulfide thereof, the atom ratio of molybdenum to nickel being between about 5 and about 6, at a temperature between about 400° F. and about 800° F. and a pressure between about 200 and about 900 pounds per square inch gauge such that the degree of unsaturation of said aromatically unsaturated hydrocarbon in the feed is lowered.

References Cited in the file of this patent

UNITED STATES PATENTS

| 1,908,286 | Dorrer | May 6, 1933 |
| 2,760,907 | Attane et al. | Aug. 28, 1956 |
| 2,878,180 | Watkins | Mar. 17, 1959 |
| 2,894,903 | McGrath et al. | July 14, 1959 |
| 2,904,500 | Beuther et al. | Sept. 15, 1959 |
| 2,917,448 | Beuther et al. | Dec. 15, 1959 |
| 2,945,803 | Beuther et al. | July 19, 1960 |

UNITED STATES PATENT OFFICE
CERTIFICATE OF CORRECTION

Patent No. 3,167,496                            January 26, 1965

Ernest Solomon

It is hereby certified that error appears in the above numbered patent requiring correction and that the said Letters Patent should read as corrected below.

In the grant, line 2, and in the heading to the printed specification, lines 3 and 4, for "assignor, by mesne assignments, to Pullman Incorporated", each occurrence, read -- assignor to Pullman Incorporated --.

Signed and sealed this 5th day of April 1966.

(SEAL)
Attest:

ERNEST W. SWIDER                                 EDWARD J. BRENNER
Attesting Officer                                    Commissioner of Patents